United States Patent
Imanishi et al.

(10) Patent No.: US 10,424,799 B2
(45) Date of Patent: Sep. 24, 2019

(54) FUEL CELL SYSTEM AND CONTROL METHOD THEREOF

(71) Applicant: TOYOTA JIDOSHA KABUSHIKI KAISHA, Toyota-shi, Aichi-ken (JP)

(72) Inventors: Hiroyuki Imanishi, Toyota (JP); Tsuyoshi Maruo, Toyohashi (JP); Takashi Yamada, Hekinan (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 446 days.

(21) Appl. No.: 14/933,388

(22) Filed: Nov. 5, 2015

(65) Prior Publication Data

US 2016/0141690 A1 May 19, 2016

(30) Foreign Application Priority Data

Nov. 14, 2014 (JP) .................. 2014-231982

(51) Int. Cl.
*H01M 8/04858* (2016.01)
*H01M 8/0432* (2016.01)
*H01M 8/04537* (2016.01)
*H01M 8/04007* (2016.01)

(52) U.S. Cl.
CPC ..... *H01M 8/04902* (2013.01); *H01M 8/0432* (2013.01); *H01M 8/04067* (2013.01); *H01M 8/0491* (2013.01); *H01M 8/04641* (2013.01); *H01M 8/04649* (2013.01)

(58) Field of Classification Search
CPC .......... H01M 8/04902; H01M 8/0432; H01M 8/04641; H01M 8/04649; H01M 8/0491
See application file for complete search history.

(56) References Cited

U.S. PATENT DOCUMENTS

| | | | |
|---|---|---|---|
| 8,435,686 B2 * | 5/2013 | Miyata | H01M 8/0432 429/428 |
| 2007/0259256 A1 | 11/2007 | Le Canut et al. | |
| 2009/0039815 A1 * | 2/2009 | Fujino | B60L 11/1887 318/440 |
| 2010/0239930 A1 | 9/2010 | Umayahara et al. | |
| 2010/0291446 A1 | 11/2010 | Aso et al. | |
| 2011/0274993 A1 | 11/2011 | Okuyoshi et al. | |

FOREIGN PATENT DOCUMENTS

| | | |
|---|---|---|
| CN | 101911361 A | 12/2010 |
| GB | 1467023 * | 3/1977 |
| JP | 2002-246053 A | 8/2002 |
| JP | 2002-367650 A | 12/2002 |
| JP | 2006-164555 A | 6/2006 |
| JP | 2007-335220 | 12/2007 |

(Continued)

*Primary Examiner* — Ula C Ruddock
*Assistant Examiner* — Thomas H. Parsons
(74) *Attorney, Agent, or Firm* — Finnegan, Henderson, Farabow, Garrett & Dunner, LLP

(57) ABSTRACT

An object is to suppress drying of a fuel cell during continuous operation with high load. There is provided a fuel cell system including a fuel cell. The fuel cell system comprises an impedance detector that is configured to detect an impedance of the fuel cell; and a current limiter that is configured to limit an output current of the fuel cell with a limiting rate. The current limiter changes the limiting rate, based on the detected impedance.

4 Claims, 10 Drawing Sheets

(56) References Cited

FOREIGN PATENT DOCUMENTS

| | | |
|---|---|---|
| JP | 2009-158383 | 7/2009 |
| JP | 2010-135341 A | 6/2010 |
| JP | 2011-113647 | 6/2011 |
| JP | 2013-235751 | 11/2013 |
| JP | 2013-239290 A | 11/2013 |
| JP | 2013-239351 A | 11/2013 |
| JP | 2014-207049 A | 10/2014 |
| WO | WO 2010/073383 A1 | 7/2010 |

* cited by examiner

FUEL CELL SYSTEM AND CONTROL METHOD THEREOF

CROSS-REFERENCE TO RELATED APPLICATIONS

The present application claims priority from Japanese patent application P2014-231982 filed on Nov. 14, 2014, the entirety of disclosure of which is hereby incorporated by reference into this application.

BACKGROUND

Field

The present invention relates to a fuel cell system and a control method of the fuel cell system.

Related Art

As described in WO2010/073383, a proposed fuel cell system estimates a distribution of water content in a cell plane of a fuel cell and limits the electric current that is taken out of the fuel cell, based on the estimation result. The estimation may be based on, for example, cooling water temperature of the fuel cell.

SUMMARY

An increase in cooling water temperature is, however, delayed relative to the actual progress of drying of unit cells in the fuel cell during continuous operation with high load. The above prior art technique may accordingly apply current limitation after the progress of drying of the unit cells in the fuel cell. This may lead to poor controllability and result in increasing the amount of heat generation in the fuel cell. This causes a problem that drying of the unit cells in the fuel cell proceeds and makes it difficult to recover the state of an electrolyte membrane to the adequate wet state.

In order to address at least part of the above problems, the invention may be implemented by any of the following aspects.

(1) According to one aspect of the invention, there is provided a fuel cell system including a fuel cell. The fuel cell system may comprise an impedance detector that is configured to detect an impedance of the fuel cell; and a current limiter that is configured to limit an output current of the fuel cell with a limiting rate. The current limiter may change the limiting rate, based on the detected impedance. Compared with a change of cooling water temperature, a change of impedance has the higher response to drying of the fuel cell. The fuel cell system of this aspect accordingly enables current limitation to be applied prior to progress of drying of the fuel cell. As a result, this suppresses an increase in heat generation of the fuel cell even during continuous operation with high load. Accordingly, the fuel cell system of this aspect suppresses the fuel cell from being dried during continuous operation with high load.

(2) In the fuel cell system of the above aspect, when the detected impedance is equal to a second impedance value that is higher than a first impedance value, the current limiter may set a lower limiting rate than a limiting rate at the impedance equal to the first impedance value under condition of a fixed temperature. The fuel cell system of this aspect sets the lower limiting rate at the higher impedance and thereby applies the stricter current limitation. The higher impedance results in the lower water content of the fuel cell and is more likely to dry the fuel cell. The stricter current limitation is accordingly set at the higher impedance. This sufficiently suppresses drying of the fuel cell.

(3) The fuel cell system of the above aspect may further comprise a temperature detector that is configured to detect temperature of the fuel cell. The current limiter may additionally change the limiting rate, based on the detected temperature. The fuel cell system of this aspect controls drying of the fuel cell, based on the temperature of the fuel cell. This more effectively suppresses drying of the fuel cell.

(4) In the fuel cell system of the above aspect, when the detected temperature is equal to a second temperature that is higher than a first temperature, the current limiter may set a lower limiting rate than a limiting rate at the temperature equal to the first temperature under condition of a fixed impedance. The fuel cell system of this aspect sets the lower limiting rate at the higher temperature of the fuel cell and thereby applies the stricter current limitation. The higher temperature of the fuel cell is likely to dry the fuel cell. The stricter current limitation is accordingly set at the higher temperature of the fuel cell. This more effectively suppresses drying of the fuel cell.

(5) According to another aspect of the invention, there is provided a control method of a fuel cell system including a fuel cell. The control method of the fuel cell system may comprise detecting an impedance of the fuel cell; limiting an output current of the fuel cell with a limiting rate; and changing the limiting rate, based on the detected impedance. The control method of the fuel cell system of this aspect suppresses the fuel cell from being dried during continuous operation with high load, like the fuel cell system of the above aspect.

The invention may be implemented by any of various aspects other than the fuel cell system and the control method of the fuel cell system described above, for example, a vehicle equipped with the fuel cell system, a computer program that implements the functions corresponding to the respective steps of the control method of the fuel cell system, and a non-transitory storage medium in which the computer program is stored.

The following describes an embodiment of the invention.

DESCRIPTION OF THE EMBODIMENTS

A. General Configuration

Figure 1:
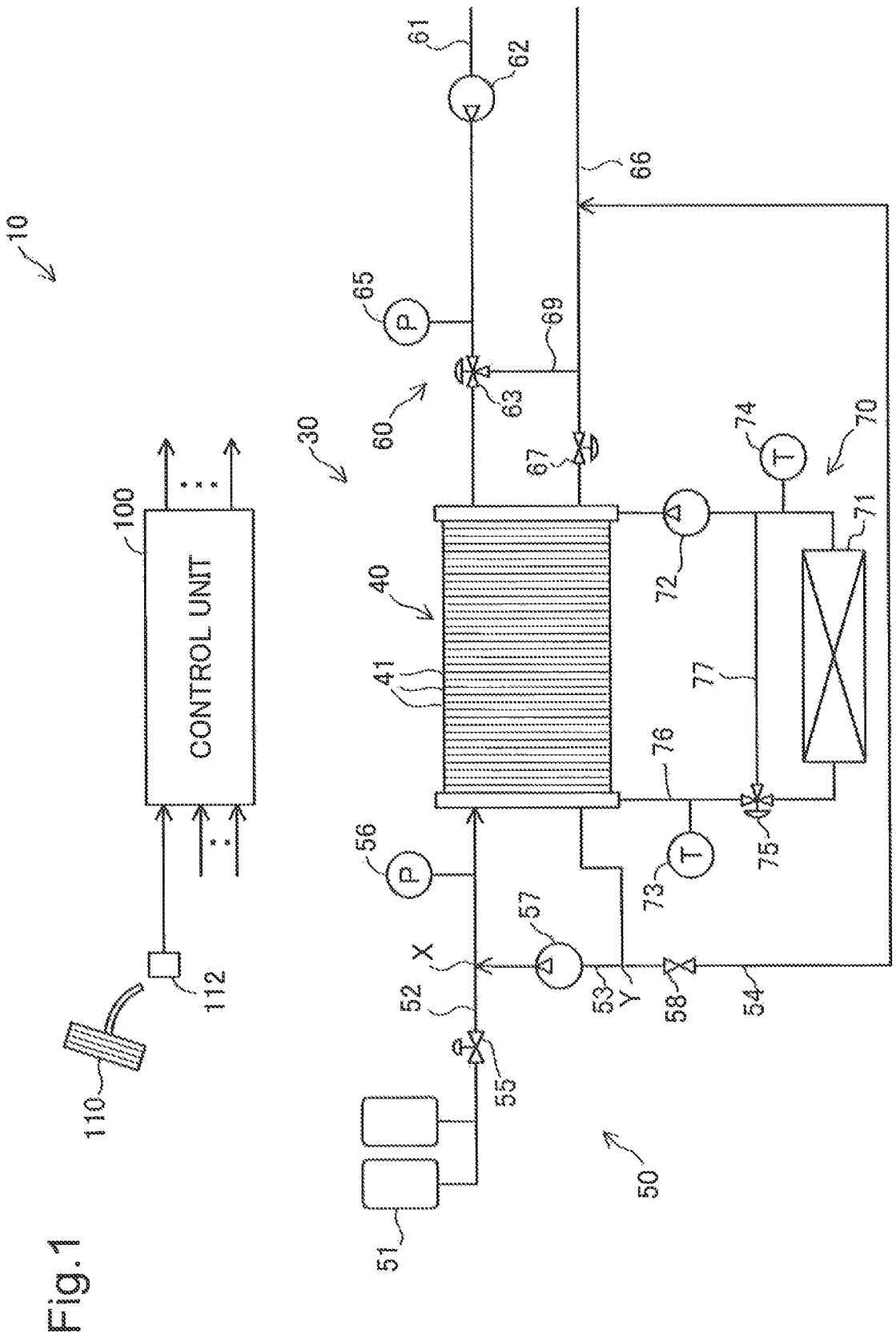
FIG. 1 is a diagram illustrating the schematic configuration of a fuel cell vehicle according to one embodiment of the invention.

FIG. 1 is a diagram illustrating the schematic configuration of a fuel cell vehicle 10 according to one embodiment of the invention. The fuel cell vehicle 10 is a four-wheel vehicle and is equipped with a fuel cell system 30. The fuel cell system 30 includes a fuel cell stack 40, a hydrogen gas supply discharge mechanism 50, an air supply discharge mechanism 60, a cooling water circulation mechanism 70 and a control unit 100.

The fuel cell stack 40 is a unit that generates electricity through electrochemical reaction of hydrogen and oxygen and is configured by stacking a plurality of unit cells 41. The unit cell 41 is mainly comprised of an anode, a cathode, an electrolyte and separators. The fuel cell stack 40 may be any of various types of fuel cells but is a polymer electrolyte fuel cell according to this embodiment.

The hydrogen gas supply discharge mechanism 50 is configured to supply and discharge hydrogen gas to and from the fuel cell stack 40. The hydrogen gas herein means a hydrogen-rich gas and is not limited to pure hydrogen. The hydrogen gas supply discharge mechanism 50 includes a hydrogen tank 51, a hydrogen gas supply path 52, a hydrogen gas circulation path 53, and a hydrogen gas discharge path 54.

The hydrogen tank 51 is configured to store high-pressure hydrogen gas. The hydrogen gas supply path 52 is a conduit arranged to supply the hydrogen gas stored in the hydrogen tank 51 to the fuel cell stack 40. The hydrogen gas circulation path 53 is a conduit arranged to circulate the hydrogen gas that is not consumed but is discharged from the fuel cell stack 40 to the hydrogen gas supply path 52. The hydrogen gas discharge path 54 is a conduit arranged to connect the hydrogen gas circulation path 53 with an air discharge path 66 (described later) provided in the air supply discharge mechanism 60.

An injector 55 serving as a hydrogen gas supply valve is provided on the hydrogen gas supply path 52 upstream of a connecting point X of the hydrogen gas circulation path 53 and the hydrogen gas supply path 52. The hydrogen gas supply discharge mechanism 50 also includes a pressure sensor 56. The pressure sensor 56 is provided to detect the pressure of hydrogen gas in the hydrogen gas supply path 52 downstream of the connecting point X.

A hydrogen circulation pump 57 is provided on the hydrogen gas supply path 53 downstream of a connecting point Y of the hydrogen gas discharge path 54 and the hydrogen gas circulation path 53. The hydrogen circulation pump 57 serves to circulate the hydrogen gas in the hydrogen gas circulation path 53. A purge valve 58 is provided in the middle of the hydrogen gas discharge path 54. The purge valve 58 is opened in the case of an increase in amount of impurities in the hydrogen gas circulation path 53 to discharge the impurities from the air discharge path 66.

The air supply discharge mechanism 60 is configured to supply and discharge the air as oxidizing gas to and from the fuel cell stack 40 and includes an air supply path 61, an air discharge path 66 and a bypass path 69. The air supply path 61 and the air discharge path 66 are provided as flow paths that respectively connect the fuel cell stack 40 with an air opening of the air supply path 61 and with an air opening of the air discharge path 66. An air cleaner (not shown) is provided at the air opening of the air supply path 61. The bypass path 69 is provided as a flow path that connects the air supply path 61 with the air discharge path 66.

The air supply discharge mechanism 60 also includes an air compressor 62. The air compressor 62 is provided in the middle of the air supply path 61 to take in the air through the air opening of the air supply path 61 and compress the intake air. The location where the air compressor 62 is placed is the position closer to the air opening than a connecting point of the air supply path 61 and the bypass path 69.

The air supply discharge mechanism 60 further includes a flow-dividing shutoff valve 63. The flow-dividing shutoff valve 63 is provided at the connecting point of the air supply path 61 and the bypass path 69 to divide the flow of the compressed air from the air compressor 62 into a downstream side of the air supply path 61 and the bypass path 69. This valve is called three-way valve. The "flow-dividing" herein includes not only distributing the flow rate into two branches but distributing the entire (100%) flow rate to either one of the two branches.

The air supply discharge mechanism 60 additionally includes a pressure sensor 65 serving as a pressure detector. The pressure sensor 65 detects the air pressure in the air supply path 61 between the air compressor 62 and the flow-dividing shutoff valve 63.

The air supply discharge mechanism 60 also includes a pressure-regulating shutoff valve 67. The pressure-regulating shutoff valve 67 is provided on the air discharge path 66 to regulate the flow section area of the air discharge path 66 according to the valve position. The air passing through the pressure-regulating shutoff valve 67 flows through the connecting point of the bypass path 69 and the air discharge path 66 and is discharged through the air opening to the atmosphere.

The cooling water circulation mechanism 70 is configured to cool down the fuel cell stack 40 and includes a radiator 71, a cooling water circulation pup 72, water temperature sensor 73 and 74 and a flow-dividing shutoff valve 75. The flow-dividing shutoff valve 75 is provided at a connecting point of the cooling water circulation path 76 and the bypass path 77. The cooling water circulation mechanism 70 is configured to circulate cooling water between the unit cells 41 and the radiator 71 and thereby control the operation temperature of the unit cells 41 and to bypass the radiator 71 and circulate cooling water through the bypass path 77. Such circulation of the cooling water achieves absorption of heat at the unit cells 41 and release of heat at the radiator 71. The water temperature sensor 73 is provided on the outlet side of the fuel cell stack 40 in the cooling water circulation mechanism 70 to detect the temperature of cooling water on the outlet side. The water temperature sensor 73 detects the temperature of cooling water on the outlet side so as to detect the temperature of the fuel cell stack 40. The water temperature sensor 74 is provided on the outlet side of the radiator 71 to detect the temperature of cooling water just discharged from the radiator 71.

The operation of the fuel cell system 30 is controlled by the control unit 100. The control unit 100 is implemented by a microcomputer including a CPU, a RAM and a ROM. The control unit 100 receives various pieces of information including an output signal from an accelerator positions sensor 112 and computes an output request for the fuel cell stack 40 from the received various pieces of information. The accelerator position sensor 112 is configured to detect an operation amount of an accelerator pedal 110 operated by the driver (hereinafter also referred to as "accelerator position"). The control unit 100 also receives status information from various sensors such as the pressure sensors 56 and 65.

The control unit 100 controls the operations of the injector 55, the operations of the respective valves 58, 63 and 67 and the operations of the pumps 57 and 72 and the air compressor 62, based on the computed output request and the input status information, so as to control the output of the fuel cell stack 40.

Figure 2:
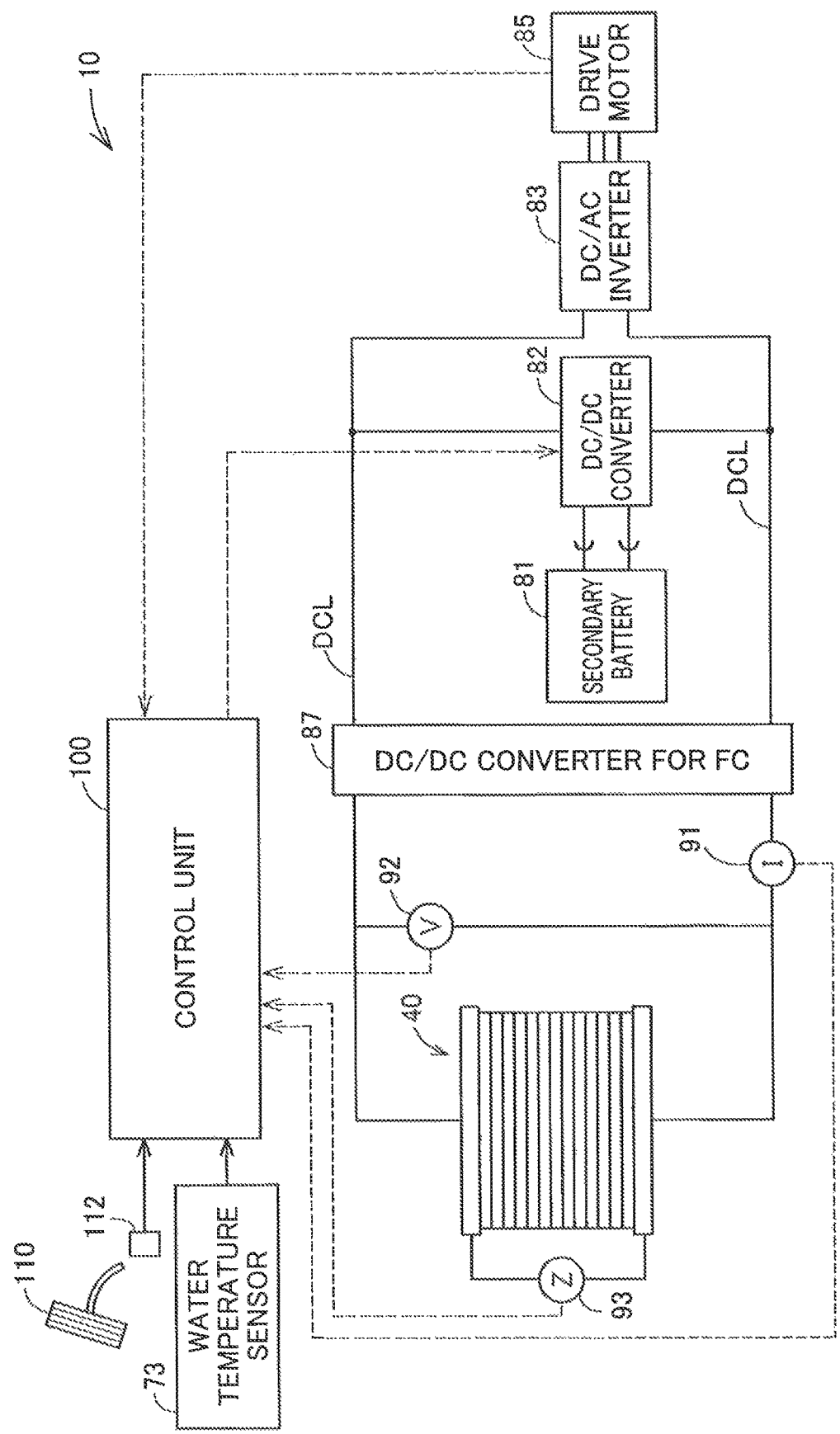
FIG. 2 is a block diagram illustrating the electrical configuration of the fuel cell vehicle.

FIG. 2 is a block diagram illustrating the electrical configuration of the fuel cell vehicle 10. The fuel cell vehicle 10 further includes a secondary battery 81, a DC/DC converter 82, a DC/DC converter for FC 87, a DC/AC inverter 83 and a drive motor 85.

The fuel cell stack 40 is connected with a DC power line DCL via the DC/DC converter for FC 87, The secondary battery 81 is connected with the DC power line DCL via the DC/DC converter 82. The DC power line DCL is connected with the DC/AC inverter 83, The DC/AC' inverter 83 is also connected with the drive motor 85.

The secondary battery 81 works as an auxiliary power supply of the fuel cell stack 40 and may be implemented by, for example, a chargeable and dischargeable nickel hydride battery or lithium ion battery. The DC/DC converter 82 serves as a charge discharge controller to control charging and discharging of the secondary battery 81 and adjusts the voltage level of the DC power line DCL to a value suitable for charging or discharging, in response to an instruction from the control unit 100. In the case where the output of the fuel cell stack 40 is insufficient relative to the output request determined according to the accelerator position, the DC/DC converter 82 causes the secondary battery 81 to be discharged to compensate for the insufficiency. The DC/DC converter for FC 87 serves as a charge discharge controller to control charging and discharging of the fuel cell stack 40.

The DC/AC inverter 83 converts DC power obtained from the fuel cell stack 40 and the secondary battery 81 into AC power. The drive motor 85 may be implemented by a three-phase motor and produces rotational driving force according to the AC power from the DC/AC inverter 83. When a rotor of the drive motor 85 is rotated by an external force, the drive motor 85 works as a generator to generate AC power (regenerative power). The regenerative power is converted into DC power by the DC/AC inverter 83 and is accumulated in the secondary battery 81 via the DC/DC converter 82.

An ammeter 91, a voltmeter 92 and an impedance meter 93 are provided in the periphery of the fuel cell stack 40 as a group of sensors to detect the power generation state of the fuel cell stack 40. The impedance meter 93 applies a high-frequency AC voltage to the fuel cell stack 40 to measure the impedance of the fuel cell stack 40. The measurements results of the ammeter 91, the voltmeter 92 and the impedance meter 93 are sent to the control unit 100.

The control unit 100 computes an output voltage measurement value (power generation state) of the fuel cell stack 40 from the input measurement value of the voltmeter 92 (shown in FIG. 1). The control unit 100 also controls an SOC detector (not shown) to detect the state of charge (SOC) of the secondary battery 81. The control unit 100 sets the output voltages of the DC/DC converter for FC 87 and the DC/DC converter 82, based on these pieces of information, and controls the output powers of the fuel cell stack 40 and the secondary battery 81. The control unit 100 also controls the DC/AC inverter 83 to regulate the frequency of the AC power and causes the drive motor 85 to generate a required torque.

B. Output Control Process

Figure 3:
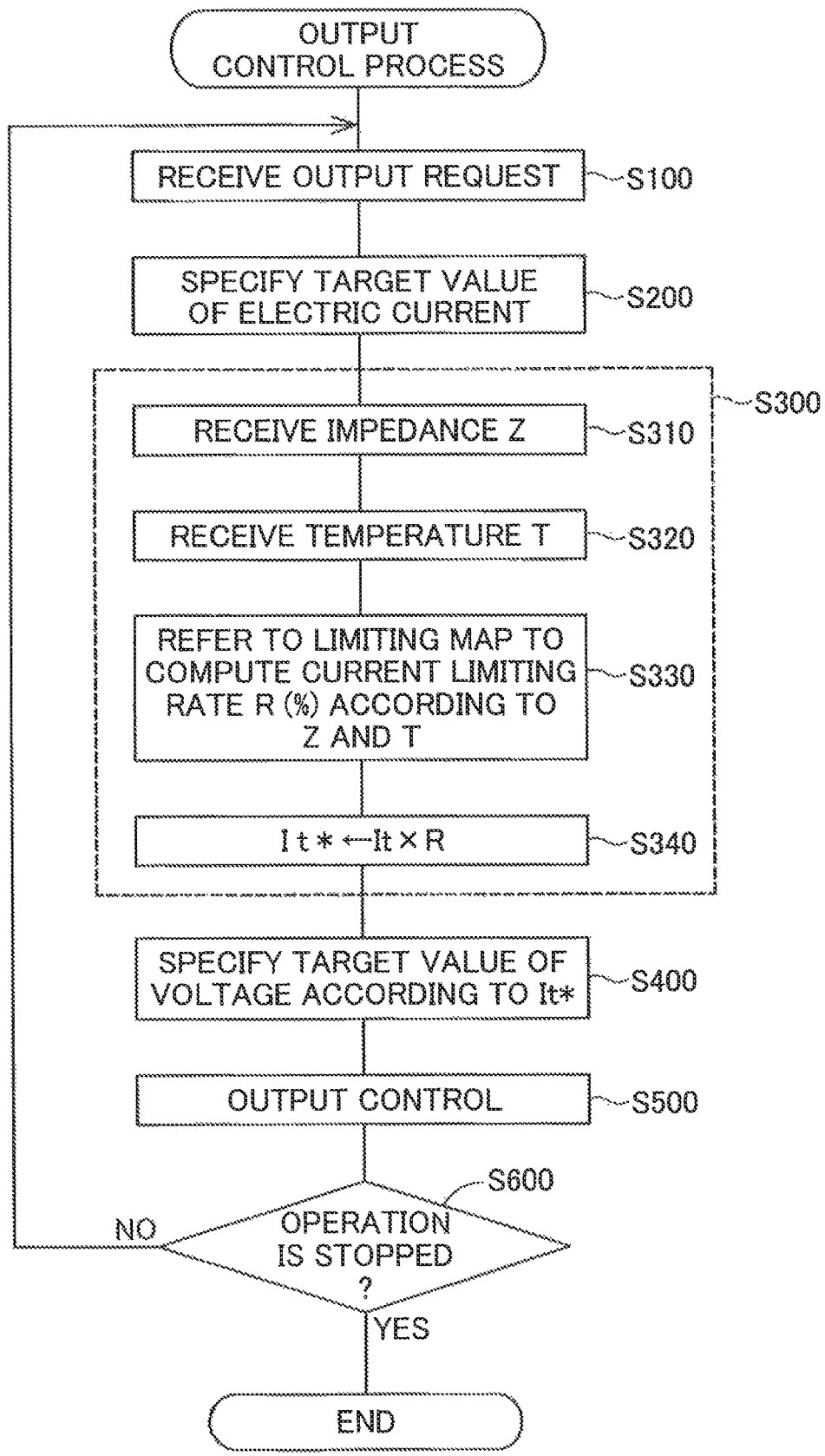
FIG. 3 is a flowchart showing an output control process performed by a control unit.

FIG. 3 is a flowchart showing an. output control process of the fuel cell stack 40 performed by the control unit 100. The output control process is performed repeatedly after an on-operation of a starter switch for starting the fuel cell stack 40. On start of the output control process, the control unit 100 receives an output request that is the request for the output of the fuel cell stack 40 that is determined from the accelerator position and various other pieces of info oration (step S100). The control unit 100 subsequently determines an electric power that is to be output from the fuel cell stack 40, based on the received output request, and specifies a target value of electric current of the fuel cell stack 40 in order to obtain the determined electric power (step S200).

Figure 4:
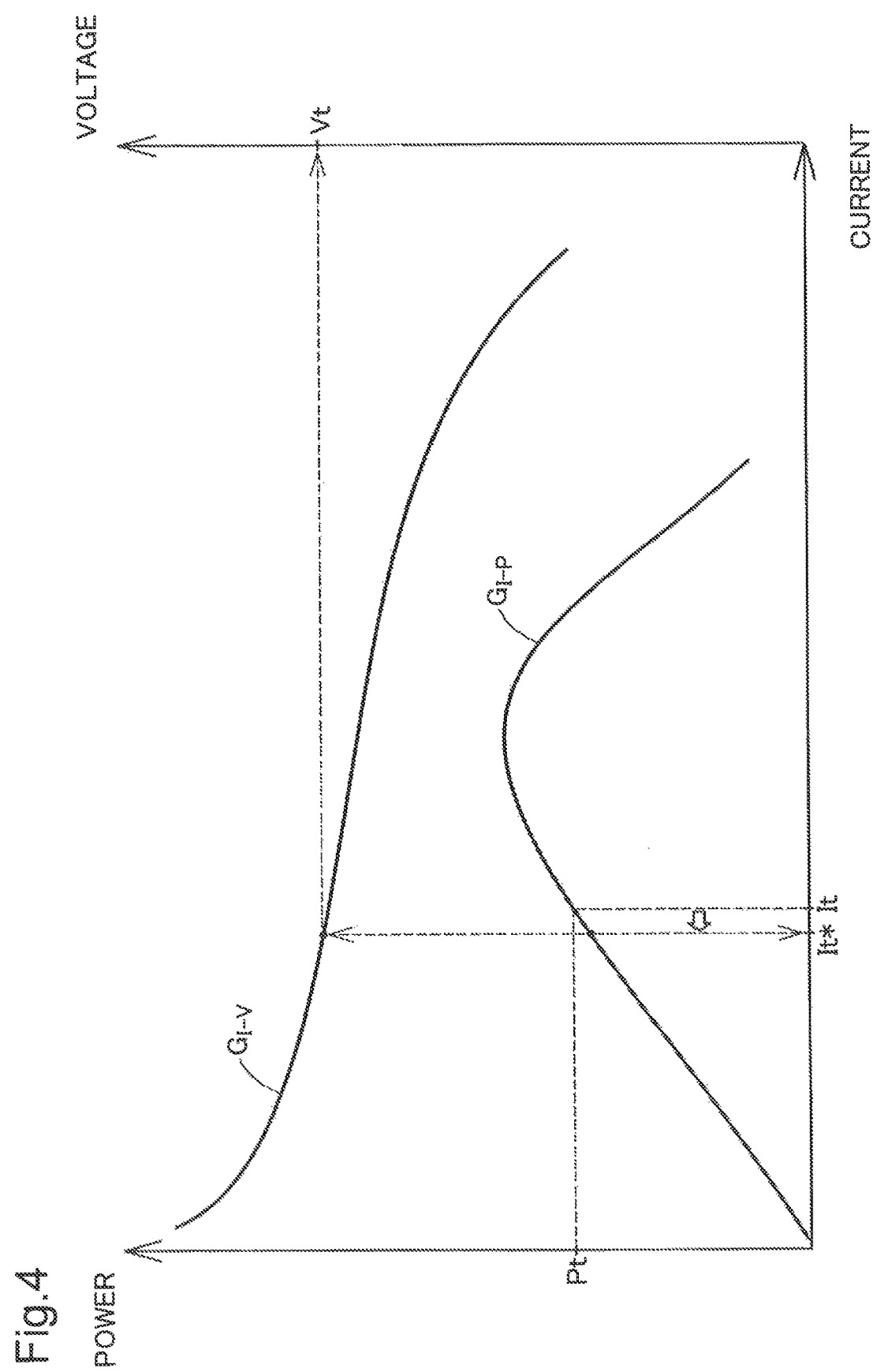
FIG. 4 is a diagram illustrating a process of obtaining a target value of electric current.

FIG. 4 is a diagram illustrating the process of obtaining the target value of electric current at step S200. FIG. 4 shows a. current-power characteristic (I-P characteristic) curve GI-P of the fuel cell stack 40, with the electric power as left ordinate and the electric current as abscissa. FIG. 4 also shows a current-voltage characteristic (I-V characteristic) graph GI-V that is referred to at step S400 described later, with the voltage as right ordinate and the electric current as abscissa.

Generally, the I-P characteristic graph of the fuel cell is shown as a concave down curve. The I-V characteristic graph of the fuel cell is shown as a lateral (lying) S-shaped curve that the voltage gradually decreases with an increase in electric current. The control unit 100 stores in advance information regarding the I-P characteristic and the I-V characteristic of the fuel cell stack 40, as information for control of the fuel cell stack 40. The control unit 100 obtains a command value of electric current of the fuel cell stack 40, based on the information for control as described below in detail.

The control unit 100 determines an electric power that is to be output from the fuel cell stack 40 (target power Pt), based on the output request received at step S100. The control unit 100 then refers to the I-P characteristic of the fuel cell stack 40 to specify a target value of electric current that is to be output from the fuel cell stack 40 (target current It) in order to satisfy the target power Pt.

The I-P characteristic and the I-V characteristic of the fuel cell stack 40 are varied according to the operating condition of the fuel cell stack 40 such as the operating temperature. It is accordingly preferable that the control unit 100 stores in advance the information for control with regard to each operating condition and adequately selects the information for control according to the current operating condition of the fuel cell stack 40.

Referring back to FIG. 3, at step S300 subsequent to step S200, the control unit 100 performs a current limiting process to set an upper limit of the target current It specified at step S200. The following describes the details of the current limiting process at step S300.

The control unit 100 first receives an impedance Z from the impedance meter 93 (step S310), and receives a temperature T of the fuel cell stack 40 from the water temperature sensor 73 (step S320). The processes of steps S310 and S320 may be performed in parallel, or the process of step S320 may be performed prior to the process of step S310. The control unit 100 then refers to a current limiting map stored in advance in the ROM to compute a current limiting rate R according to the impedance Z and the temperature T (step S330).

Figure 5:
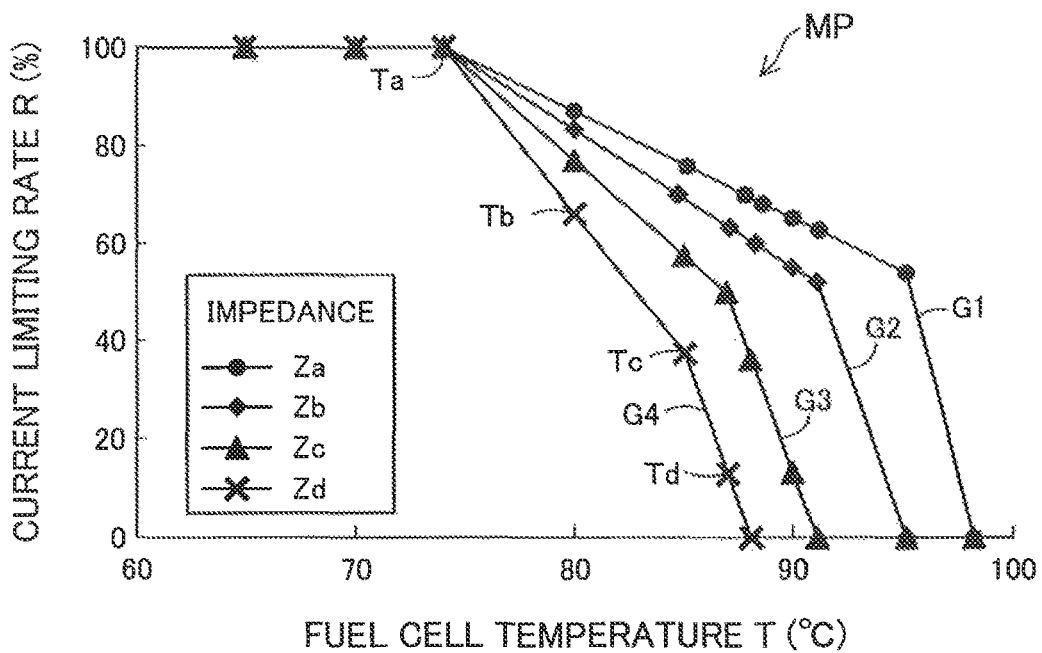
FIG. 5 is a diagram illustrating one example of current limiting map.

FIG. 5 is a diagram illustrating one example of current limiting map MP. As illustrated, the current limiting map MP is a three-dimensional map data that has temperature T of the fuel cell as abscissa and current limiting rate R as ordinate and plots a variations in current limiting rate R against the temperature T of the fuel cell with regard to each impedance Z. The current limiting rate R is a parameter used to specify the upper limit of the target current It. The upper limit of the target current It decreases with a decrease in current limiting rate R. This indicates the stricter current limitation. The map data includes four graphs G1 to G4: the graph G1 with the impedance Z=Za, the graph G2 with the impedance Z=Zb, the graph G3 with the impedance Z=Zc and the graph G4 with the impedance Z=Zd. Za is, for example, 100 [mΩ]. Za, Zb, Zc and Zd increase in this sequence; i.e., Zd>Zc>Zb>Za.

In the respective graphs G1 to G4, the current limiting rate R is equal to 100% at the temperature T of the fuel cell stack 40 that is equal to or lower than, for example, Ta. The current limiting rate R gradually decreases with an increase in temperature T that exceeds, for example, Ta. Among the graphs G1 to G4, the graph G4 having the highest impedance Z has the highest rate of decrease. The rate of decrease is gradually lowered with a decrease in impedance Z (from the graph G3, G2 to G1). Accordingly, in the state that the temperature T of the fuel cell stack 40 exceeds Ta, the current limiting rate R at a fixed temperature decreases in the sequence of G1, G2, G3 and G4. According to this embodiment, the graph G4 is a curve that makes even continuous operation of the fuel cell stack 40 with high load unlikely to cause drying of the unit cells 41 in the fuel cell stack 40 to proceed**. The number of graphs included in the current limiting map MP is four in this embodiment, but may be any plural number, for example, 2, 3, 5, 6, . . . 10.

Figure 6:
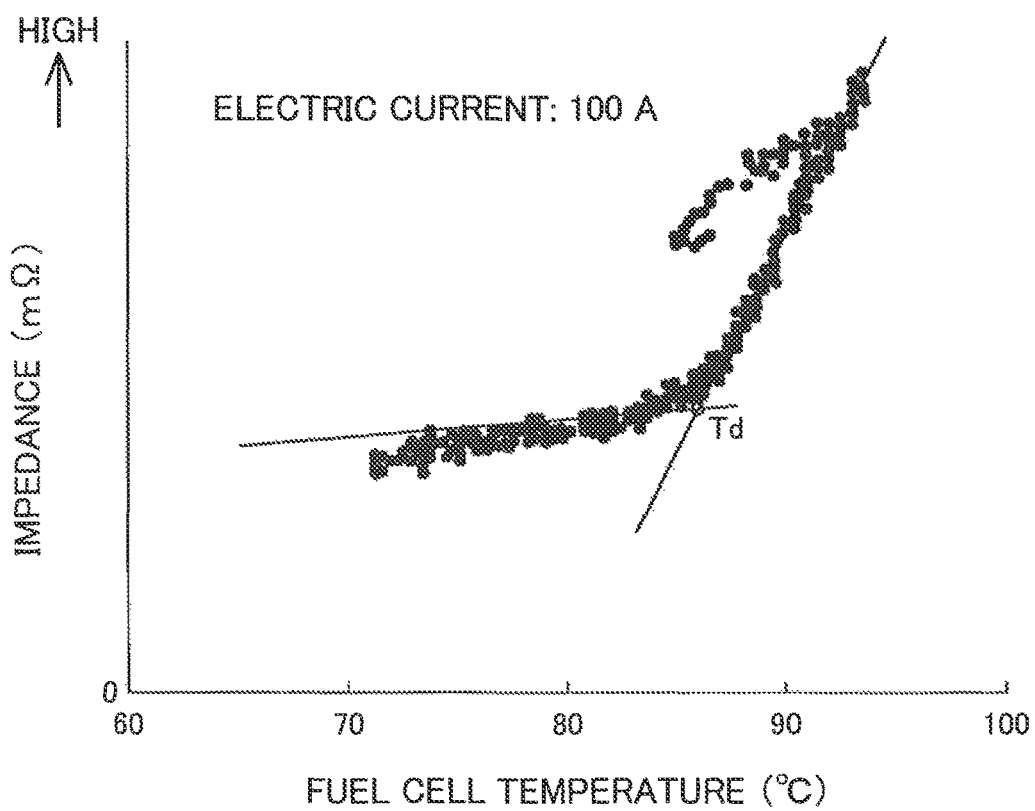
FIG. 6 is a diagram showing a graph used to make the current limiting map.
Figure 7:
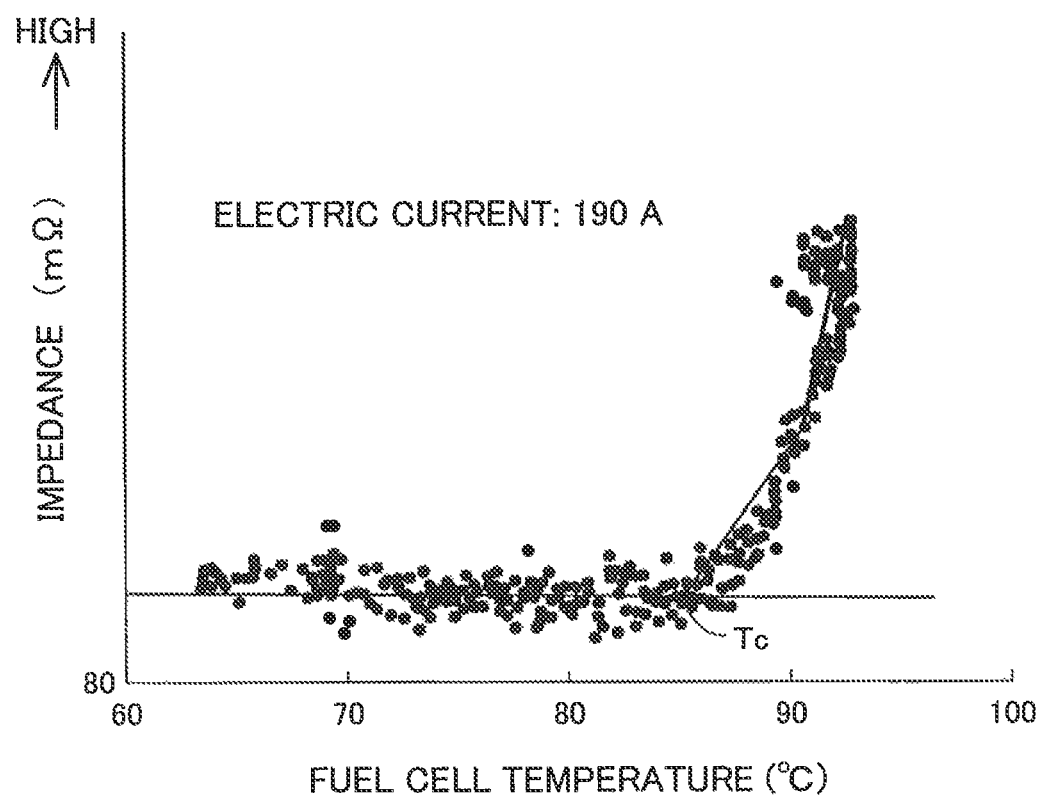
FIG. 7 is a diagram showing a graph used to make the current limiting map.
Figure 8:
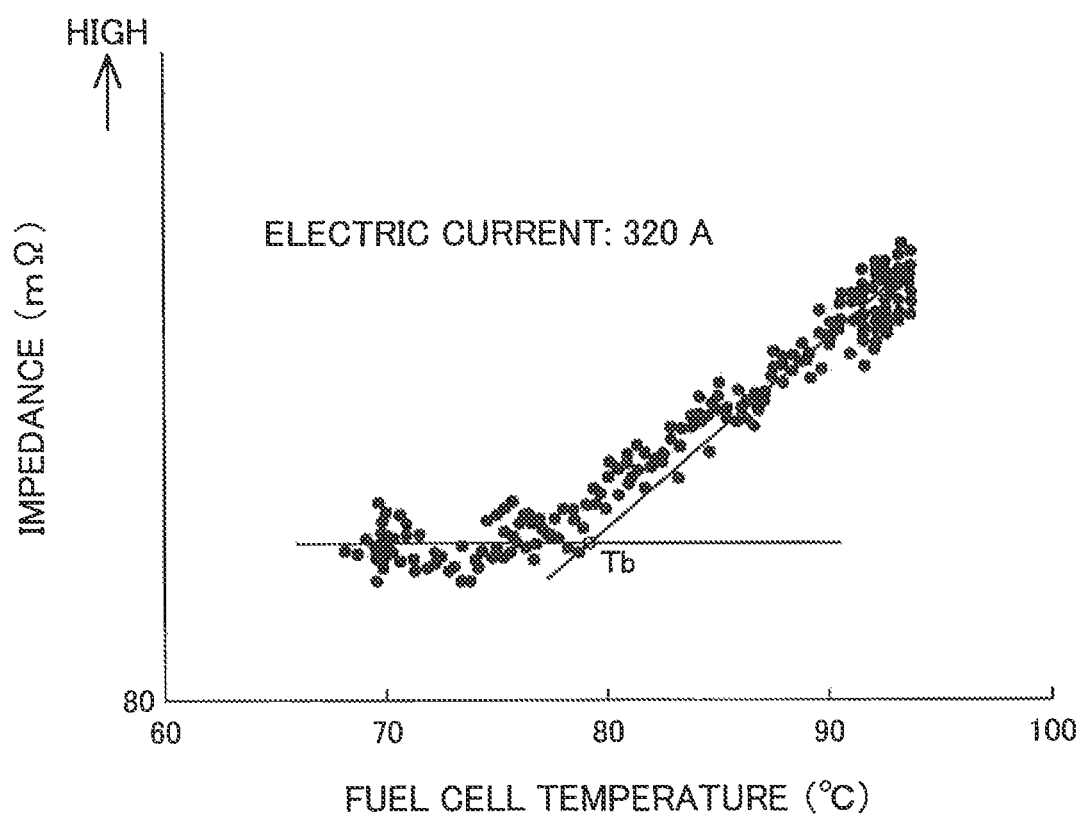
FIG. 8 is a diagram showing a graph used to make the current limiting map.
Figure 9:
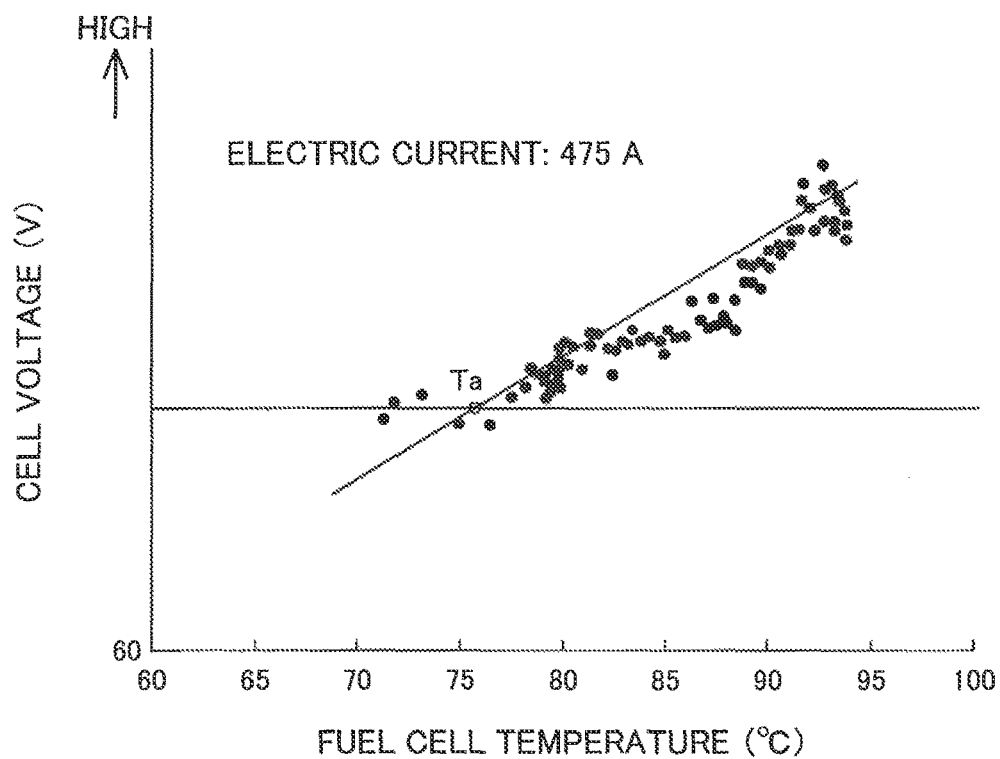
FIG. 9 is a diagram showing a graph used to make the current limiting map.

FIGS. 6 to 9 are diagrams showing graphs used to make the current limiting map MP. FIG. 6 is a graph obtained by experiment or by simulation to show an increase in impedance, which is used as the indication of drying of the unit cells 41, by gradually increasing the temperature T of the fuel cell stack 40 during operation of the fuel cell stack 40 in a steady state at an output current of 100 [A]. FIG. 7 is a graph obtained in a similar manner to FIG. 6 during operation of the fuel cell stack 40 in a steady state at an output current of 190 [A]. FIG. 8 is a graph obtained in a similar manner to FIG. 6 during operation of the fuel cell stack 40 in a steady state at an output current of 320 [A]. FIG. 9 is a graph obtained in a similar manner to FIG. 6 during operation of the fuel cell stack 40 in a steady state at an output current of 475 [A].

The graphs of FIGS. 6 to 9 indicate inflection points at which the impedance Z drastically changes with the temperature T. The graph of FIG. 6 shows that the impedance Z drastically increases (this means that the fuel cell becomes dried) in the area of the temperature T over Td at the output current of 100 [A]. The graph of FIG. 7 shows that the impedance Z drastically increases in the area of the temperature T over Tc that is smaller than Td at the output current of 190 [A]. The graph of FIG. 8 shows that the impedance Z drastically increases in the area of the temperature T over Tb that is smaller than Tc at the output current of 320 [A]. The graph of FIG. 9 shows that the impedance Z drastically increases in the area of the temperature T over Ta that is smaller than Tb at the output current of 475 [A]. The graph G4 of the current limiting map MP (shown in FIG. 5) is made by using these inflection points Ta to Td obtained from the graphs of FIGS. 6 to 9. The inflection points Ta to Td increase in this sequence; i.e., Td>Tc>Tb>Ta.

The graph G4 of FIG. 5 with regard to the impedance Z=Zd is used as the base. The graphs G3 to G1 of FIG. 5 are then made such that: when the impedance Z=Zc, the current limiting rate R at the temperature T becomes +10% greater than the base with regard to the impedance Z=Zc: when the impedance Z=Zb, the current limiting rate R at the temperature T becomes +20% greater than. the base with regard to the impedance Z=Zb; and when the impedance Z=Za, the current limiting rate R at the temperature T becomes +30% greater than the base with regard to the impedance Z=Za. The increase rates of 10%, 20% and 30% with regard to the respective values Zc, Zb and Za of the impedance Z are determined by experiment or by simulation.

Referring back to FIG. 3, at step S330, the control unit 100 reads the current limiting map MP of FIG. 5 described above from the ROM and refers to this map MP to determine the current limiting rate R corresponding to the impedance Z input at step S310 and the temperature T input at step S320. When the impedance Z is equal to or lower than the value Za, the control unit 100 refers to the graph G1 to determine the current limiting rate R. When the impedance Z is equal to or higher than the value Zd, the control unit 100 refers to the graph G4 to determine the current limiting rate R. When the impedance Z is between Zd and Za and is a value other than the impedances of the graphs G1 to G4, the control unit 100 calculates an internally dividing point between relevant adjacent graphs and compares the impedance Z with the calculated internally dividing point to determine the current limiting rate R.

After completion of step S330 in FIG. 3, the control unit 100 multiplies the target current It specified at step S200 by the current limiting rate It determined at step S330 to calculate a new target current It* (step S340). After completion of step S340, the control unit 100 terminates the current limiting process of step S300 and proceeds to step S400.

At step S400, the control unit 100 refers to the I-V characteristic of the fuel cell stack 40 shown in FIG. 4 to specify a target value of voltage (target voltage Vt) of the fuel cell stack 40 that is required to output the new target current It* calculated at step S340. More specifically, as shown in FIG. 4, as the result of the current limiting process of step S300, the target current shifts from the target current It corresponding to the target power Pt to meet the output request to the new target current It* determined by multiplication of the current limitation. At step S400, the control unit 100 reads a target voltage Vt corresponding to the new target current It* from the current-voltage characteristic (I-V characteristic) graph GI-V.

After completion of step S400 in FIG. 3, the control unit 100 performs output control that gives an instruction to the DC/DC converter for FC 87 to control the fuel cell stack 40 to output the target voltage Vt and thereby output the new target current It* calculated at step S340 (step S500). The control unit 100 accordingly serves as the current limiter. The control unit 100 repeats the processing of steps S100 to S500 until the operation of the fuel cell vehicle 10 is stopped (step S600). When the operation of the fuel cell vehicle 10 is stopped (step S600: YES), the control unit 100 terminates the output control process.

Figure 10:
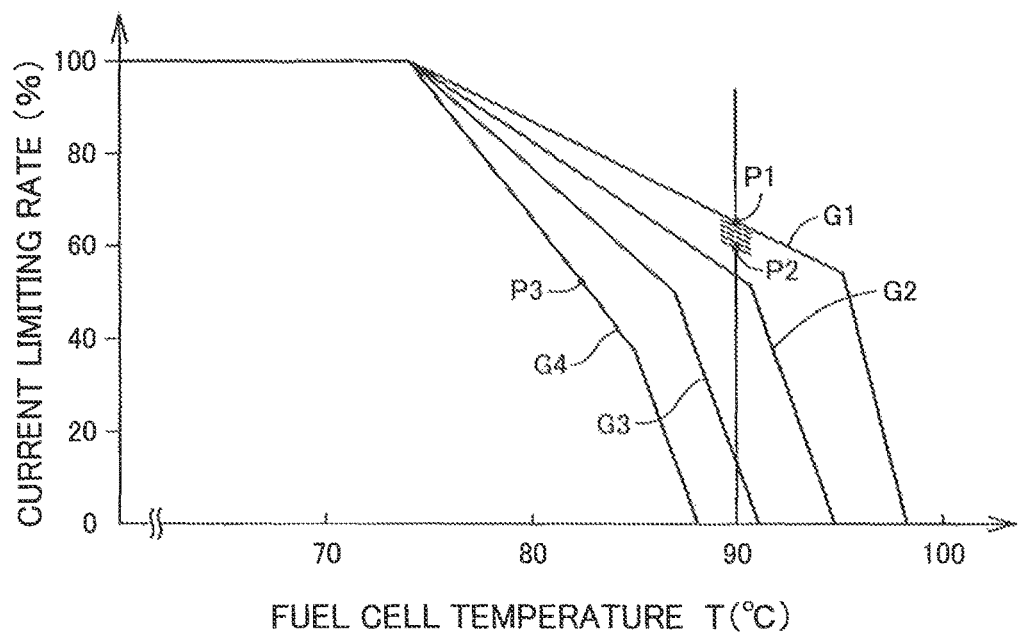
FIG. 10 is a diagram illustrating a shift of an operation point on the current limiting map by the output control process.

FIG. 10 is a diagram illustrating a shift of an operation point on the current limiting map MP by the output control process described above. In the initial state that the fuel cell stack 40 is in an adequate wet state and has the impedance Z equal to or lower than Za (for example, 100 [mΩ]), the graph G1 is employed for the control even in the case of an increase in temperature T that indicates the cooling water temperature of the fuel cell stack 40. This provides the high current limiting rate R and the mild current limitation.

Continuous operation of the fuel cell stack 40 with high load keeps the fuel cell stack 40 at high temperature and starts drying the unit cells 41 to increase the impedance Z. When the impedance Z exceeds 100 [mΩ], the current limiting rate R is controlled to a limit value at an internally dividing point between the graphs G1 and G2. For example, in the case where the impedance Z increases from 100 [mΩ] to 105 [mΩ] at the temperature T kept unchanged, the operation point is shifted from an operation point P1 on the graph G1 to an operation point P2, so as to decrease the current limiting rate R from Ra to Rb (>Ra), as shown in FIG. 10. This indicates the stricter current limitation.

The current limiting rate R then decreases with an increase in impedance Z. When the impedance Z becomes equal to or higher than Zd, the operation point is shifted to an operation point P3 on the graph G4. Accordingly drying of the unit cells 41 does not proceed even in the case of continuous operation. In the description above, it is assumed that the temperature T of the fuel cell decreases with an increase in impedance Z.

C. Advantageous Effects of Embodiment

The fuel cell system 30 having the above configuration changes the current limiting rate R according to the impedance Z. This allows for current limitation prior to progress of drying of the unit cells 41. of the fuel cell stack 40. As a result, even in the case of continuous operation of the fuel cell stack 40 with high load, this configuration suppresses an increase in heat generation of the fuel cell. Accordingly, the fuel cell system 30 suppresses drying of the fuel cell during continuous operation with high load.

Figure 11:
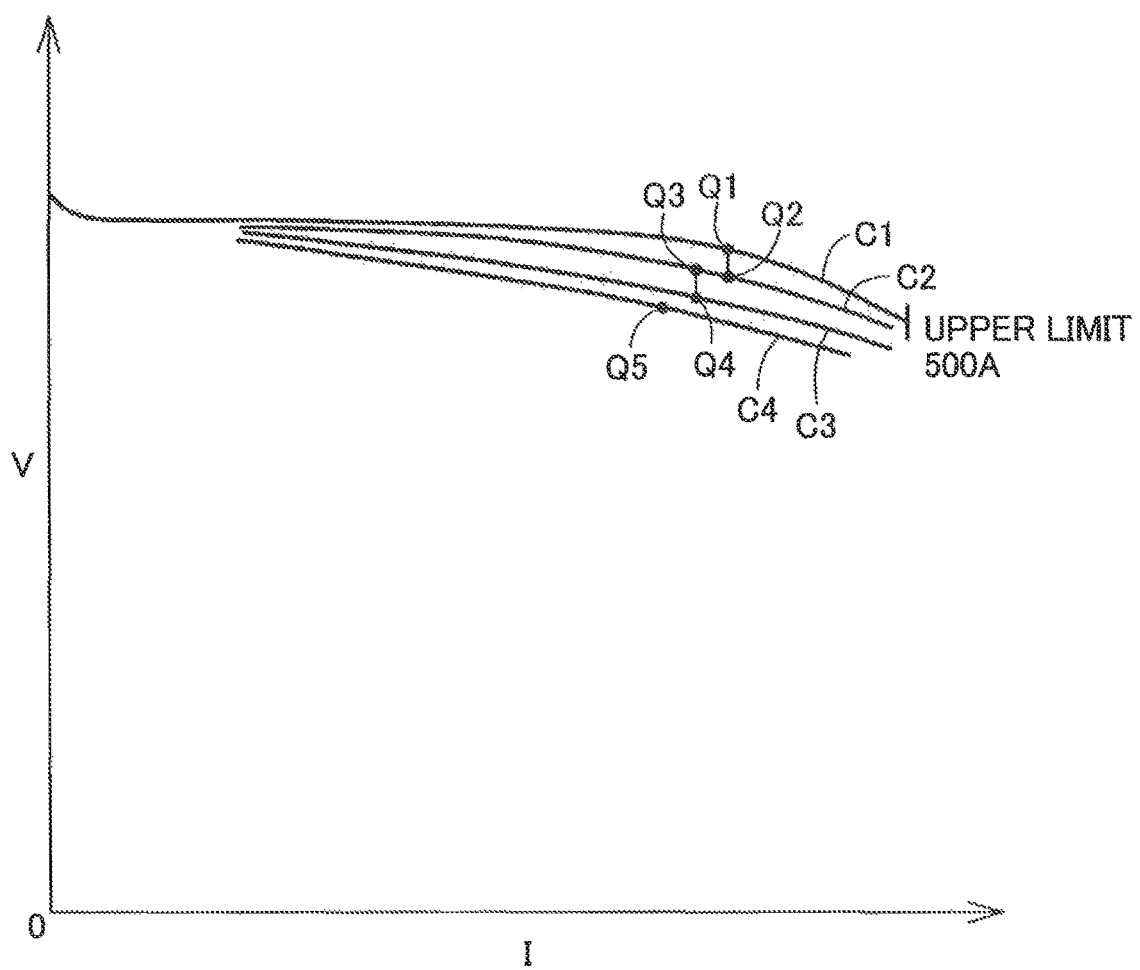
FIG. 11 is a diagram illustrating a shift of the power generation state of a fuel cell stack by the output control process.

FIG. 11 is a diagram illustrating a shift of the power generation state of the fuel cell stack 40 by the output control process. FIG. 11 shows current-voltage characteristic (hereinafter referred to as "IV characteristic") curves of the fuel cell stack 40. It is assumed that the fuel cell stack 40 is operated at an operation point Q1 under the conditions of the temperature T of the fuel cell stack 40 equal to 80° C. and the impedance Z equal to Za (for example, 100 [mΩ]). When the temperature T increases from this operating condition, the output control process of FIG. 3 is performed to limit the electric current. The current limitation at this moment provides only a slight decrease of electric current. Continuous operation of the fuel cell stack 40 under the current limitation causes drying of the unit cells 41 to proceed and increases the slope of the IV characteristic curve. As a result, the IV characteristic curve is changed from a base curve C1 to a curve C2, so that the operation point is shifted to an operation point Q2 on the curve C2. The slope of the IV characteristic curve corresponds to the impedance Z. Shifting the operation point to Q2 increases the impedance Z. The output control process is performed using the current limiting map MP of FIG. 5 to further apply the current limitation and shift the operation point to an operation point Q3 on the curve C2.

Shifting the operation point to Q3 based on the impedance Z is attributed to applying the current limitation on the earlier assumption of drying of the unit cells 41, compared with the prior art technique. This reduces an increase in amount of heat generation and accordingly causes a smaller rise in temperature T, compared with the prior art technique. The IV characteristic curve is then changed from the curve C2 to a curve C3, so that the operation point is shifted to an operation point Q4 on the IV characteristic curve C3. Shifting the operation point Q4 increases the impedance Z. The IV characteristic curve is then changed from the curve C3 to a curve C4. The curve C4 has a little difference from the curve C3. This results in convergence of the change in IV characteristic and substantially stabilizes the IV characteristic to suppress a rise in temperature T. As understood from the graph of FIG. 11, this suppresses an increase in heat generation in the fuel cell even during continuous operation of the fuel cell stack 40 with high load.

Figure 12:
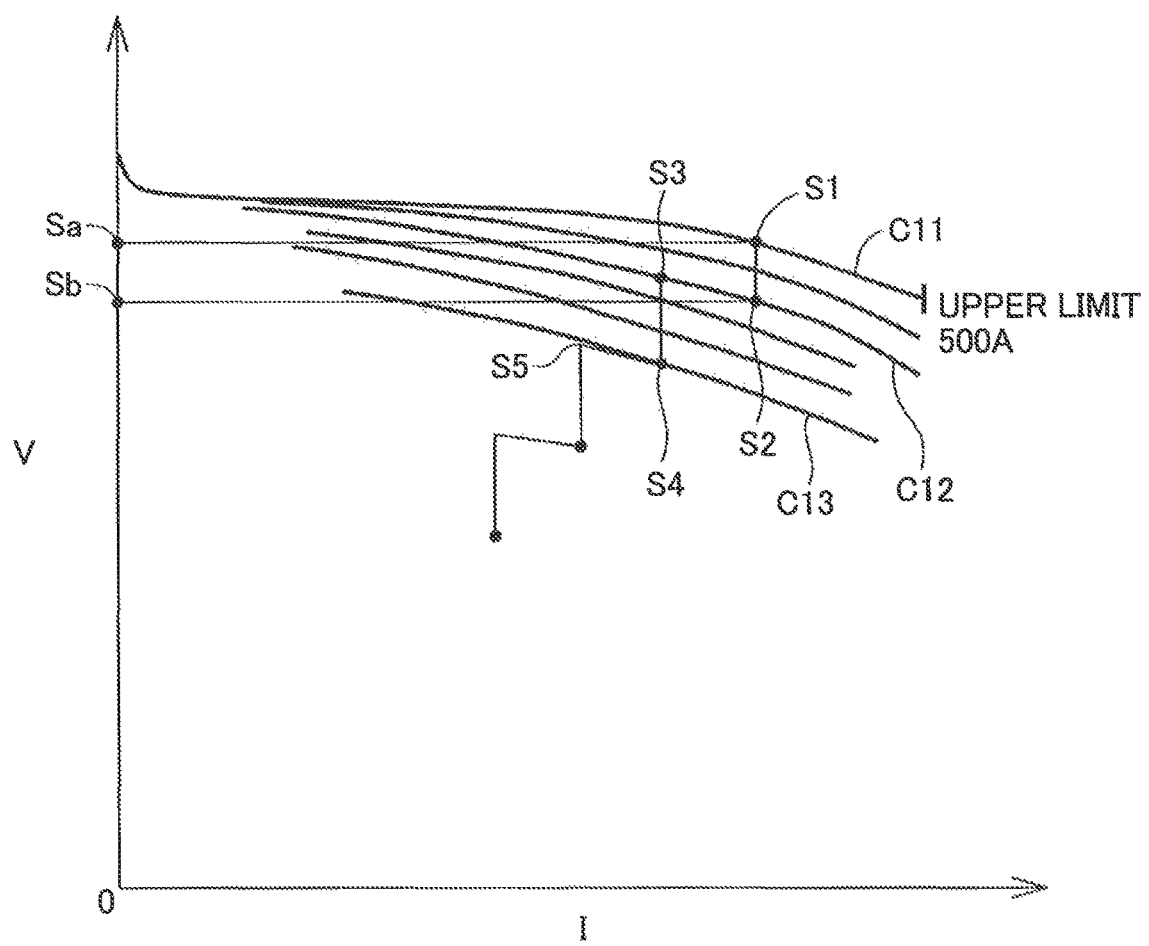
FIG. 12 is a diagram illustrating a shift of the power generation state of a fuel cell stack as a reference example.

FIG. 12 is a diagram illustrating a shift of the power generation state of a fuel cell stack as a reference example. The reference example applies a current limitation based on only the cooling water temperature of a fuel cell. It is assumed that the fuel cell stack is operated at an operation point S1 under the condition of the temperature of the fuel cell stack (cooling water temperature) equal to 80° C. When the temperature increases from this operating condition, the electric current is limited. Continuous operation of the fuel cell stack under the current limitation causes drying of unit cells to proceed and increases the slope of the IV characteristic curve. As a result, the IV characteristic curve is significantly changed from a base curve C11 to a curve C12, so that the operation point is shifted to an operation point S2 on the curve C12. The product of a voltage change by the shift of the operation. point from S1 to S2 and a corresponding current (area of a rectangle of S1, S1, S2 and Sb) corresponds to an increase in amount of power generation in the fuel cell. The temperature of the fuel cell stack increases with an increase in amount of power generation. This results in applying further stricter current limitation and shifts the operation point to an operation point S3 on the curve C12. An increase in cooling water temperature is delayed relative to the actual drying of the unit cells. The reference example accordingly causes a larger temperature rise, compared with the above embodiment.

Continuous operation of the fuel cell stack under the current limitation causes drying of the unit cells to further proceed and increases the slope of the IV characteristic curve. As a result, the IV characteristic curve is significantly changed from the curve C12 to a curve C13, so that the operation point is shifted to an operation point S4 on the curve C13. This repeats the cycle of increasing the amount of power generation in the fuel cell stack, increasing the cooling water temperature, and applying the further stricter current limitation (operation point S5). This results in divergence of the change of the state. In the reference example, continuous operation of the fuel cell stack with high load is likely to dry up the unit cells of the fuel cell stack. This makes it difficult to recover the state of the electrolyte membrane to the adequate wet state.

D. Modifications

* Modification 1

The above embodiment uses the water temperature sensor 73 provided on the outlet side of the fuel cell stack 40 as the temperature detector configured to detect the temperature of the fuel cell. The water temperature sensor 73 is, however, not essential but may be replaced by a water temperature sensor provided on the inlet side of the fuel cell stack 40 or a temperature sensor that is configured to directly detect the internal temperature of the fuel cell stack 40.

In the above embodiment, the current limiting rate R is set to 100% at the temperature T of the fuel cell stack that is equal to or lower than Ta. When the impedance is equal to a second impedance value that is higher than a first impedance value in a range of the temperature T of the fuel cell stack higher than Ta, the current limiting rate is controlled to a lower value than the current limiting rate at the impedance equal to the first impedance value under the condition of a fixed temperature.

According to a modification, the current limiting rate of lower than 100% may be set, irrespective of the temperature of the fuel cell stack. In this modification, when the impedance is equal to a second impedance value that is higher than a first impedance value, the current limiting rate may be controlled irrespective of the temperature of the fuel cell stack, to a lower value than the current limiting rate at the impedance equal to the first impedance value under the condition of a fixed temperature.

In the above embodiment, when the temperature of the fuel cell is equal to a second temperature that is higher than a first temperature, the current limiting rate is controlled to a lower value than the current limiting rate at the temperature of the fuel cell equal to the first temperature under the condition of a fixed impedance. According to a modification, when the temperature of the fuel cell is equal to a second temperature that is higher than a first temperature, the current limiting rate may be controlled to an identical value with or a higher value than the current limiting rate at the temperature of the fuel cell equal to the first temperature under the condition of a fixed impedance.

The current limiting rate may be determined irrespective of the temperature of the fuel cell stack.

* Modification 2

The above embodiment uses the impedance meter 93 as the impedance detector. According to a modification, the impedance may be determined based on the measurement results of the ammeter 91 and the voltmeter 92.

* Modification 3

In the above embodiment, the fuel cell system is mounted on the vehicle. The fuel cell system of the above embodiment may, however, be mounted on a moving body other than the vehicle or may be stationary to be installed in a building, a facility or the like.

Part of the functions configured by the software in the above embodiment may be implemented by hardware configuration (for example, integrated circuit), and part of the functions configured by the hardware in the above embodiment may be implemented by software configuration.

The invention is not limited to any of the embodiment and its modifications described above but may be implemented by a diversity of configurations without departing from the scope of the invention. For example, the technical features of any of the embodiment and its modifications corresponding to the technical features of the respective aspects described in SUMMARY may be replaced or combined appropriately, in order to solve part or all of the problems described above or in order to achieve part or all of the advantageous effects described above. Components other than those described in independent claims among components of any of the embodiment and its modifications are additional components and may be omitted appropriately.

What is claimed is:

1. A fuel cell system including a fuel cell, the fuel cell system comprising
an impedance detector that is configured to detect an impedance of the fuel cell;
a temperature detector that is configured to detect temperature of the fuel cell; and
a current limiter that is programmed to limit an output current of the fuel cell with a limiting rate, wherein
the current limiter is programmed to change the limiting rate, based on the detected impedance and the detected temperature, wherein
when the detected temperature is less than or equal to a predetermined threshold, the current limiter is programmed to set the limiting rate at a fixed rate regardless of the detected impedance, and
when the detected temperature is greater than the predetermined threshold, the current limiter is programmed to set the limiting rate based on the detected impedance such that the limiting rate is
a first rate for the detected temperature in a case where the detected impedance is a first value, and
a second rate that is lower than the first rate for the same detected temperature in a case where the detected impedance is a second value that is higher than the first value.

2. The fuel cell system according to claim 1,
wherein when the detected temperature is equal to a second temperature that is higher than a first temperature, the current limiter is programmed to set a lower limiting rate than a limiting rate at the temperature equal to the first temperature under condition of a fixed impedance.

3. A control method of a fuel cell system including a fuel cell, the control method comprising
detecting an impedance of the fuel cell;
detecting temperature of the fuel cell;
limiting an output current of the fuel cell with a limiting rate; and
changing the limiting rate, based on the detected impedance and the detected temperature of the fuel cell, such that
when the detected temperature is less than or equal to a predetermined threshold, the limiting rate is set at a fixed rate regardless of the detected impedance, and
when the detected temperature is greater than the predetermined threshold, the limiting rate is set based on the detected impedance such that the limiting rate is
a first rate for the detected temperature in a case where the detected impedance is a first value, and
a second rate that is lower than the first rate for the same detected temperature in a case where the detected impedance is a second value that is higher than the first value.

4. The control method of the fuel cell system according to claim 3,
wherein when the detected temperature is equal to a second temperature that is higher than a first temperature, the changing the limiting rate sets a lower limiting rate than a limiting rate at the temperature equal to the first temperature under condition of a fixed impedance.

* * * * *